June 30, 1925. 1,543,947
C. C. MOORE
APPARATUS FOR THE DEHYDRATION OF VEGETABLE PRODUCE
Filed Aug. 13, 1923 2 Sheets-Sheet 1
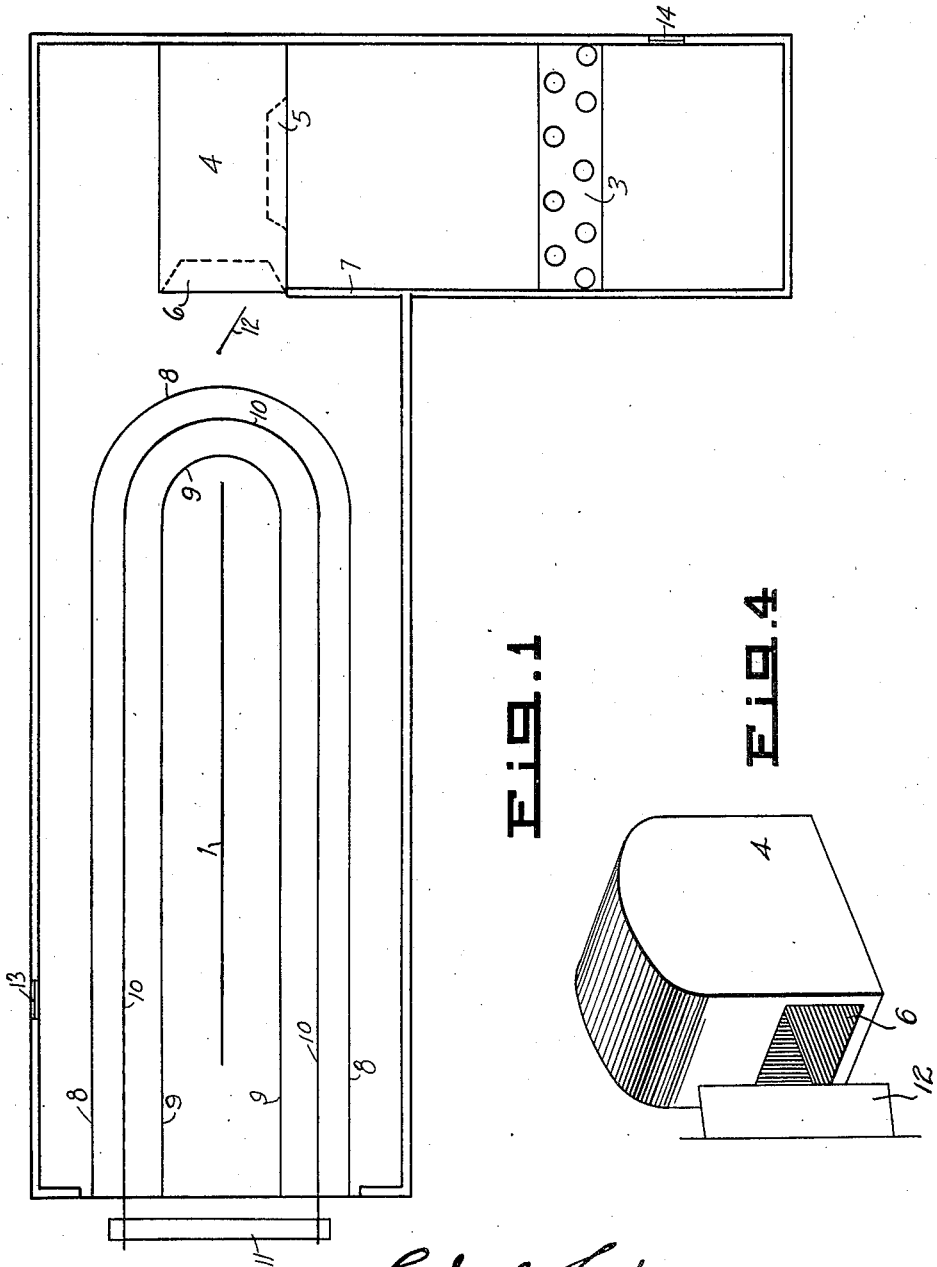

June 30, 1925.
C. C. MOORE
1,543,947
APPARATUS FOR THE DEHYDRATION OF VEGETABLE PRODUCE
Filed Aug. 13, 1923
2 Sheets-Sheet 2
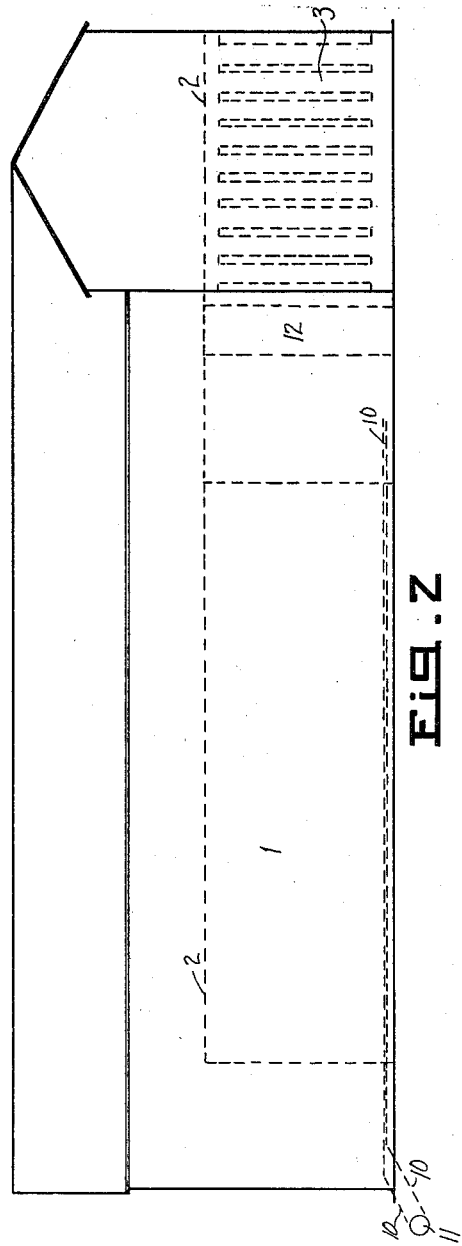
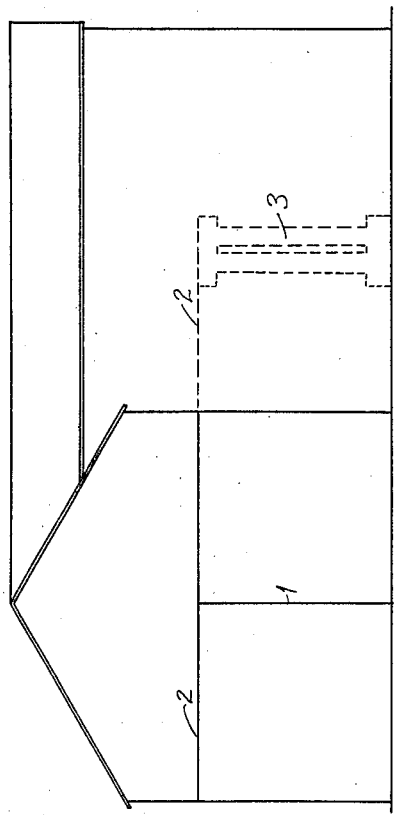

Patented June 30, 1925.

1,543,947

UNITED STATES PATENT OFFICE.

CHARLES C. MOORE, OF SAN FRANCISCO, CALIFORNIA.

APPARATUS FOR THE DEHYDRATION OF VEGETABLE PRODUCE.

Application filed August 13, 1923. Serial No. 657,204.

*To all whom it may concern:*

Be it known that I, CHARLES C. MOORE, of the city and county of San Francisco, and State of California, have invented certain new and useful Apparatus for the Dehydration of Vegetable Produce, of which the following is the specification.

In the dehydration of vegetable produce it is advantageous to have the produce spread in trays and these trays loaded on cars, with a suitable air space between the trays, and the cars moved through an enclosure of suitable construction while heated air is passed through the enclosure for the purpose of drying the produce. The produce absorbs heat from the passing air, which heat vaporizes the moisture in the produce, and the passing air absorbs the moisture vapor, so formed, and conveys it away from the produce. The passing air is thus seen to serve a double purpose; as it conveys heat to the produce, and conveys the moisture vapor from the produce when such vapor has been formed.

A desirable form of enclosure would be one considerably longer than it is wide and high, such as a tunnel, at one end of which the air enters under pressure from a blower which has drawn the air through a suitable heating device before sending it through the tunnel. It is also desirable to have a train of cars, each car loaded with trays of produce, move through the tunnel while in process of being dried, so as to have each car of produce subjected to all the different conditions of the passing air that might exist at different positions in the tunnel. When the car of produce at one end of the train is dried, it is taken out, and a car of fresh produce added to the other end of the train. This procedure results in a sequence of cars of produce in the tunnel, each car being in a different stage of the drying process, and at these various stages of drying subjected to the various conditions of the passing air. If the produce is of the nature of an uncut fruit, such as prunes or grapes, where the moisture vapor must exude through the skin, it is desirable to have the successive stages of the drying suitable to the positions of a car in the tunnel as regards the conditions of the passing air at such positions.

As is generally known, vegetable produce that is being dried liberates its moisture vapor more readily in the early stages of the drying than in the latter stages; and it is also known that chemical changes in the composition of the produce, such as caramelization of the sugars, are more apt to occur when the drying is being finished than at other stages of the drying process. To obtain efficiency in dehydration, it is evident that the cars of produce should be entered at the end of the tunnel where the temperature is lowest, and moved toward the end of the tunnel where the temperature is highest, as this would result in a higher temperature at the stage of drying when the moisture is most difficult to vaporize. To obtain a finished product where the composition has undergone the lowest degree of chemical changes, it is evident that the drying should not be finished at the high temperature end of the tunnel.

In order to meet more nearly the conditions of desirability that are involved in the efficiency in dehydration and the desirability of the finished product, I employ two tunnels, preferably placed parallel and adjacent, with the heated air entering adjacent ends of the tunnels. The cars of produce entered at one end of the tunnel, fartherest from the incoming heated air, move along through this tunnel until coming to the end where the heat is highest, then around into the other tunnel where the heat is also highest in that tunnel, and on toward the end of that tunnel where the heat is lowest.

If these tunnels are the same in dimensions, such that each tunnel holds the same number of cars of produce being dried, and all of the produce, while cold as the outside atmosphere temperature, is entered at the end of the same tunnel, it is apparent that more units of heat will be absorbed by the produce while in the ingoing tunnel than while in the outcoming tunnel; and as the moisture of the produce is more readily vaporized at the commencement of the drying than at the finish, it is apparent that a greater volume of air would be required to carry off the moisture vapor from the ingoing tunnel than the outcoming one. For this reason, I apportion the volume of air passing through the tunnels so that more air passes through one tunnel than passes through the other. While this apportioning may be accomplished by the use of two blowers of different capacities, I accomplish the purpose by the use of one blower and a deflector placed so as to deflect a greater portion of air into one tunnel than into the other. By apportioning the air, it is possible to obtain an equalization of the drying stages in the two tunnels such that each car of produce being dried would require the same interval of time to pass through the ingoing tunnel that is required for it to pass through the outcoming one.

As prevously stated the passing air serves a double purpose, namely, to convey heat to the produce, and to convey the moisture vapor that is formed from the produce. In dehydration practice it has been found advantageous to have the passing air move with considerable velocity, and of considerable volume, in order to have it permeate the spaces between the trays of produce, and the spaces between the pieces of produce on each tray. If the heated air makes but a single passage through the dehydrator, and is then discharged to the atmosphere, it is apparent that all of the heat units in the passing air that were not absorbed by the produce are lost. For instance, common practice has shown that in a tunnel form of dehydrater, where the air makes but one passage, only about 20 per cent of the heat units in the air are absorbed by the produce, the remaining 80 per cent of heat units being discharged to the atmosphere. To avoid this loss of heat units, it is advantageous to have the passing air returned to the intake of the blower after the air has passed through some form of heating system to replenish the heat units that were absorbed when it passed over the produce. This practice is commonly referred to as recirculation in drying.

When the passing air is continuously recirculated in a dehydrater, it is obvious that the air will, eventually, become saturated with the moisture vapor that has been liberated from the produce; which means that one of its purposes, the conveying of the moisture vapor from the produce, ceases to be effective. To avoid this condition, it is necessary to discharge a portion of the air and replenish this discharge with fresh air from the atmosphere. The higher the moisture content of the discharged air, the lower is the amount of air to be discharged to carry off a specific amount of moisture vapor; and as the heat units in the discharged air are lost, it is desirable to make the discharge from a position in the dehydrater where the air carries the highest amount of moisture that it is practicable to obtain. For this reason, I have the discharge made from a position in the ingoing tunnel near the entrance to that tunnel where the air is higher in moisture content than at any other position in the dehydrater.

The amount of air necessary to discharge, for the elimination of the moisture vapor from the dehydrater, should be, at least, equivalent to the rate at which moisture vapor is being liberated from the produce; and knowing the rate at which moisture vapor is being liberated, and the velocity, temperature and per cent of saturation of the discharged air, it is a simple computation to determine the size of the opening that should be allowed for the discharge of air. In my apparatus, all of the air that passes through the outcoming tunnel, and all of the air, except that necessary to be discharged, that passes through the ingoing tunnel is returned, through an air passage for that purpose, and passes through a heating system and to the intake of the blower that is to, again, send it to the produce being dried. The required amount of replenishing air is taken in at a position where it can mix with the returned air just before it passes through the heating system.

For a more specific description of my apparatus, I shall refer to the accompanying sheets of drawings where Fig. 1, is the plan, Fig. 2, is the elevation, Fig. 3, is an end view of the apparatus. Fig. 4, is a perspective view of the blower and the adjustable deflector for apportioning the air that discharges into the tunnels. The outside walls and roof are of any suitable construction, and preferably of material that will reduce the loss of heat through radiation. As seen in Fig. 1, the building is the shape of the letter L, the longer part of the L comprising the double tunnels, and the shorter part adapted for the heating system and blower installation, and for recirculating the air. The vertical partition wall, 1, makes a double tunnel effect of the enclosure. The horizontal partition, 2, and the upper part of the side walls, and the roof, makes the air passage for returning the air, after it has passed through the tunnels, to the heating device, 3. This heating device may be of any suitable form, such as an electric radiator, a hot air radiator, a hot water radiator, or a steam radiator. In the drawing it is shown as a steam radiator, the steam being developed in any suitable manner and conducted to the radiator by pipe. The air is drawn through the radiator by a blower of usual design that would occupy the floor space shown at, 4; entering the blower intake, as shown in the plan view at 5, and discharged from the blower outlet, 6. The arrangement of the horizontal partition, 2, and the vertical partition, 7, causes the air that is discharged from the blower to pass along through the double tunnel enclosure until it comes to the end of the vertical partition, 1; and the closed doors at the entrance to the tunnels deflect the air upwardly to enter the return passage that leads back to the heater, 3.

The cars, on which are loaded the trays of produce to be dried, travel on the tracks, 8, and 9, these tracks leading from the entrance to one tunnel on through that tunnel and around a curve into the other tunnel and through that tunnel to the exit at the end of the tunnel. The cars are moved at such speed, and intervals of time, as may be required, by the cable, 10. This cable has its two ends attached to the drum, 11, so that as one end winds on the drum the other end unwinds from the drum, the drum being operated by suitable means. The cable is guided around the turn by suitable guide devices; and the cars are attached to the cable by suitable devices for having them moved by the cable.

The apportioning of the air from the blower to the tunnels is accomplished by use of the deflector, 12. This deflector is a vertical plane extending from the floor to the horizontal partition, 2; the deflector may be hinged at the upper and lower corners of the same edge,—as the edge nearest the blower,—in a way that it can be set at an angle to the column of air that would be discharged by the blower, as shown in Fig. 1, so as to divert more of the air discharge from the blower in the direction of one tunnel than in the direction of the other tunnel.

In the drawing, the deflector is set to deflect a greater portion of air into the ingoing tunnel. In instances where the produce to be dried is of such a nature that the greater portion of air should be deflected to the outcoming tunnel, to obtain efficiency along any certain lines, the deflector will be set at an opposite angle to that shown in the drawing.

To provide for the discharge of the amount of air necessary to convey moisture vapor from the dehydrater, an outlet is shown at, 13; and to provide for the replenishing air, an inlet is shown at, 14. As the inlet, 14, is much nearer the blower than the outlet, 13, and as there is less resistance to the passing air between the inlet, 14, and the blower; and the outlet, 13, and the blower, it is obvious that the dimensions of the inlet, 14, controlling the replenishing air, are of more importance than the dimensions of the outlet, 13. As a matter of fact, in practice I regulate the discharge by regulating the amount of air required to replenish. That is to say, I compute the amount of replenishing air required, per minute, and set the inlet opening accordingly; then make ample opening for the outlet in order that a corresponding amount of air, allowing for the difference in temperature, will be discharged.

Having thus fully described my invention, what I claim as new and desire to secure by Letters Patent of the United States, is:—

1. In a dehydration apparatus, the combination of plural enclosures adapted to receive produce to be dried therein, an air passage common to the said enclosures, means for sending air under pressure through the said air passage and on through the said enclosures, an air passage for returning the air to the intake of the said means for sending air under pressure, and means for moving the same produce that is being dried toward the passing air in one of the said enclosures and in the direction of the passing air in another of the said enclosures.

2. In a dehydration apparatus, the combination of plural enclosures adapted to receive produce to be dried therein, an air passage common to the said enclosures, means for sending air under pressure through the said air passage and on through the said enclosures in the same direction, an air passage for returning the air to the intake of the means for sending air under pressure, means for moving the same produce that is being dried toward the passing air in one of the said enclosures and in the direction of the passing air in another of the said enclosures, and means for apportioning the air such that a greater mass of air will pass through one of the said enclosures than will pass through another of the said enclosures.

3. In a dehydration apparatus, the combination of means for sending plural columns of air moving under pressure, said columns of air moving in the same direction and passing produce that is being dried, means for apportioning the air such that a greater mass of air will be in one of the said columns than will be in another of the said columns and means for moving the same produce toward one of the said columns of air and then in the direction of another of the said columns of air.

4. In a dehydration apparatus, the combination of plural enclosures adapted to receive produce to be dried therein, an air passage common to the said enclosures, means for sending air under pressure through the said air passage and on through the said enclosures, an air passage for returning the air to the intake of the said means for sending air under pressure, means for moving the same produce that is being dried toward the passing air in one of the said enclosures and in the direction of the passing air in another of the said enclosures, and means for discharging to the atmosphere any desired portion of the passing air from one of the said enclosures.

5. In a dehydration apparatus, the combination of plural enclosures adapted to receive produce to be dried therein, an air passage common to the said enclosures, means for sending air under pressure through the said air passage and on through the said enclosures in the same direction, an air passage for returning the air to the intake of the means for sending air under pressure, means for moving the same produce that is being dried toward the passing air in one of the said enclosures and in the direction of the passing air in another of the said enclosures, means for apportioning the air such that a greater mass of air will pass through one of the said enclosures than will pass through another of the said enclosures and means for discharging to the atmosphere any desired portion of the passing air from one of the said enclosures.

6. In a dehydration apparatus, the combination of means for sending plural columns of air moving under pressure, said columns of air moving in the same direction and passing produce that is being dried, means for apportioning the air such that a greater mass of air will be in one of the said columns than will be in another of the said columns, means for moving the same produce toward one of the said columns of air and then in the direction of another of the said columns of air, and means for discharging to the atmosphere any desired portion of one of the said columns of air.

7. In a dehydration apparatus, the combination of means for sending plural columns of air moving under pressure, means for varying the relative volume per minute of the said columns of air, and means for moving the same produce that is being dried from one of the said columns of air to another of the said columns of air.

8. In a dehydration apparatus, the combination of means for dividing a column of air moving under pressure into a plural of columns of air moving in the same direction, means for varying the relative volume per minute of the said columns of air, and means for moving the same produce that is being dried from one of the said columns of air to another of the said columns of air.

9. In a dehydration apparatus, the combination of means for sending plural columns of air moving under pressure, means for varying the relative volume per minute of the said columns of air, means for moving the same produce that is being dried from one of the said columns of air to another of the said columns of air, and means for discharging to the atmosphere any desired portion of one of the said columns of air.

10. In a dehydration apparatus, the combination of means for dividing a column of air moving under pressure into a plural of columns of air moving in the same direction, means for varying the relative volume per minute of the said columns of air, means for moving the same produce that is being dried from one of the said columns of air to another of the said columns of air, and means for discharging to the atmosphere any desired portion of one of the said columns of air.

11. In a dehydration apparatus, the combination of means for sending plural columns of air moved by suitable means of pressure, means for varying the relative volume per minute of the said columns of air, and means for returning the said columns of air to the intake of the said means of pressure.

12. In a dehydration apparatus, the combination of means for sending plural columns of air moved by suitable means of pressure, means for varying the relative volume per minute of the said columns of air, means for returning the said columns of air to the intake of the said means of pressure, and means for discharging to the atmosphere any desired portion of one of the said columns of air.

13. In a dehydration apparatus, the combination of an enclosure adapted to receive produce to be dried therein, means for sending air under pressure through the said enclosure, means for returning the air to the intake of the means for sending air under pressure, an air passage for admitting a specific amount of the outside atmosphere to the intake of the said means for sending air under pressure whereby a corresponding equivalent of air in the said enclosure will be forced to the outside atmosphere.

In testimony whereof I have hereunto signed my name in the presence of two subscribing witnesses.

CHARLES C. MOORE.

Witnesses:
E. G. TILTON,
W. A. BANKS.